I. A. RICHARDS.
Cutting Screw Threads.
No. 17,655.             Patented June 23, 1857.
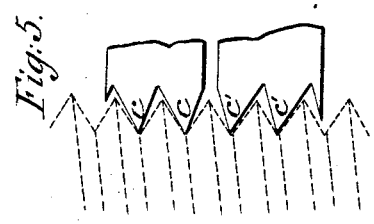
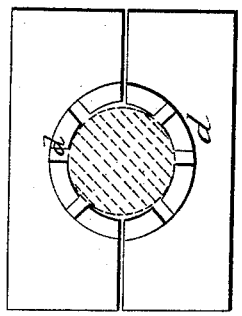 
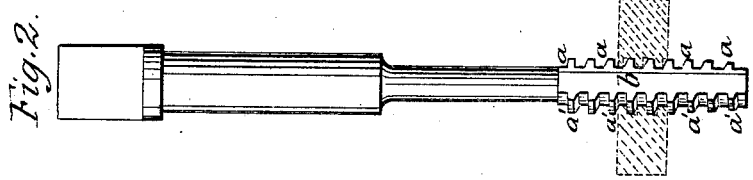
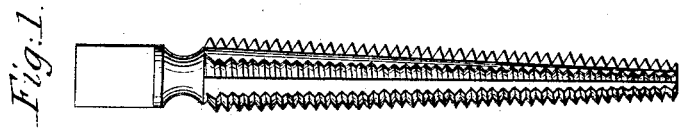

UNITED STATES PATENT OFFICE.

IRA A. RICHARDS, OF EAST BROOKFIELD, MASSACHUSETTS, ASSIGNOR TO SILAS STEVENS, OF EAST BROOKFIELD, MASSACHUSETTS.

TAP AND DIE FOR CUTTING SCREWS.

Specification of Letters Patent No. 17,655, dated June 23, 1857.

*To all whom it may concern:*

Be it known that I, IRA A. RICHARDS, of East Brookfield, in the county of Worcester and State of Massachusetts, have invented a new and useful Improvement in Taps and Dies for Cutting Screws; and I do hereby declare that the following is a full, clear, and exact description of the same, reference being had to the accompanying drawings, forming part of this specification, in which—

Figure 1 is a longitudinal view of a V-threaded tap; and Fig. 2, a longitudinal view of a square threaded tap; both exhibiting my improvement. Fig. 3 is a top view of a pair of dies with the improvement, and Fig. 4 an inside face view of one of the dies. Fig. 5 is a diagram illustrative of the operation of the dies and taps.

Similar letters of reference indicate corresponding parts where they occur in the several figures.

This invention consists in cutting away every tooth of a tap or die on one side so that it may not touch the metal or other material upon which the tap or die is in operation, cutting away the successive teeth on opposite sides alternately by which means each tooth is caused to cut on one side only but to cut more easily and with less power and clear itself better, and in cutting screws the stripping off the threads is prevented if the dies continue to be turned after a full thread is obtained. It also consists in cutting opposite scores of a two part die, both on the same side of a line drawn through the center of the die parallel with the slides on which the two parts move, so that in the screwing operation the bearing of the die upon the bolt will be only upon the edge of the score next the center line which will make it cut much easier.

To enable others skilled in the art to make and use my invention I will proceed to describe its construction and operation.

The improvement is illustrated more clearly in the representation of the square threaded tap, Fig. 2, where $a$, $a$, and $a^1$, $a^1$, represent two rows of teeth and $b$, the intermediate score. The upper sides of the teeth $a$, $a$, are cut away and the lower sides of the teeth $a^1$, $a^1$, leaving cutting edges only on the lower sides of the teeth $a$, $a$, and the lower sides of those $b$, $b$. This tap is represented in a nut which is shown in red outline in section and supposed to have its thread completed, and it is shown that the teeth of the tap only touch on one side. In the V-threaded tap shown in Fig. 1, the cutting away of the teeth is not so apparent but the manner in which they are cut away is well illustrated in Fig. 5, which represents portions of two adjacent rows of teeth of a V-threaded die, the upper row of teeth $c$, $c$, being cut away on the under side and the lower ones $c^1$, $c^1$, on the upper side, as will be seen by comparison with the red outline of the profile of the cut thread in the same figure. There is a slight difference between the modes of cutting away the square and V threads, the former being cut away most at the top of the thread and gradually less to nothing at the bottom, and the latter being cut away most at the bottom, and gradually less to nothing at the top. In making the taps and dies the threads are first cut in the usual way, then the longitudinal scores are cut in the usual manner to produce the teeth, and then the teeth are cut away on opposite sides alternately.

The improvement in the arrangement of the opposite scores $d$, $d$, of the die is illustrated in Fig. 3 where a section of a bolt in the die is represented in red color, and the central line drawn across the die parallel with the slides in which the die works to open and close, or at right angles to the partition of the die as shown in blue color.

Both the scores $d$, $d$, it will be seen, are on the right side of this central line and the bearing of the die is on the left side only of the scores, or the side next the central line.

These improvements though trifling in appearance are highly important and immediately discovered in tapping and cutting screws.

What I claim as my invention, and desire to secure by Letters-Patent, is:

1. Cutting away the teeth of taps and dies on one side substantially as and for the purposes set forth.

2. Making the opposite scores, which are parallel with the slides in which the two parts of a die work or at right angles to the partition of the die, both on the same side of a line drawn through the center of the die, substantially as and for the purposes set forth.

IRA A. RICHARDS.

Witnesses:
  B. B. ADAMS,
  AMASA ADAMS.